US006672857B2

(12) United States Patent
Hecken et al.

(10) Patent No.: US 6,672,857 B2
(45) Date of Patent: Jan. 6, 2004

(54) DEVICE FOR INTRODUCING A COATING INTO PIPES

(76) Inventors: Walter Hecken, Hauptstr. 1, D-53578 Windhagen (DE); Wolfgang Leichnitz, Saarlandstr. 55, D-53545 Linz am Rhein (DE)

( * ) Notice: Subject to any disclaimer, the term of this patent is extended or adjusted under 35 U.S.C. 154(b) by 0 days.

(21) Appl. No.: 09/884,635

(22) Filed: Jun. 19, 2001

(65) Prior Publication Data

US 2002/0007783 A1 Jan. 24, 2002

(30) Foreign Application Priority Data

Jul. 18, 2000 (DE) ........................................ 100 34 849
Jul. 26, 2000 (DE) ........................................ 100 36 451

(51) Int. Cl.[7] ................................................ B29C 70/78
(52) U.S. Cl. ........................... 425/127; 249/65; 249/83; 249/152; 425/468; 425/DIG. 112
(58) Field of Search ........................... 249/68, 83, 152, 249/153; 425/110, 127, 405.1, 468, DIG. 112; 264/267

(56) References Cited

U.S. PATENT DOCUMENTS

| | | | | | |
|---|---|---|---|---|---|
| 790,372 | A | * | 5/1905 | Langford | 264/269 |
| 2,206,410 | A | * | 7/1940 | Lally | 249/65 |
| 2,334,509 | A | * | 11/1943 | Reeves | 425/405.1 |
| 2,865,079 | A | * | 12/1958 | Marchioli et al. | 249/65 |
| 3,414,951 | A | * | 12/1968 | Schulze | 425/468 |
| 3,482,007 | A | * | 12/1969 | Routh | 425/110 |
| 3,662,045 | A | * | 5/1972 | Tierling | 264/269 |
| 4,073,841 | A | * | 2/1978 | Dultgen et al. | 264/46.6 |
| 4,341,368 | A | * | 7/1982 | Thompson et al. | 249/65 |
| 4,876,049 | A | * | 10/1989 | Aoyama et al. | 425/389 |
| 5,817,203 | A | * | 10/1998 | Moser | 264/314 |

* cited by examiner

*Primary Examiner*—Robert Davis
(74) *Attorney, Agent, or Firm*—George W. Dishong

(57) ABSTRACT

Device for introducing a coating into pipes and pipe bends and, more generally, into rotationally symmetrical bodies open at only at least one end, with an elastic, elongate, inflatable core (12), the so-called "variocore".

11 Claims, 1 Drawing Sheet

DEVICE FOR INTRODUCING A COATING INTO PIPES

FIELD OF INVENTION

The invention relates to a device for introducing a coating into pipes and pipe bends and, in general, into, in particular, rotationally symmetrical bodies open at only at least one end. Such inner coatings serve primarily for protection against wear. Thus, for example, a hard-material compound for wear-resistant pipe parts may be applied.

BACKGROUND OF THE INVENTION

Pipes are known which, as steel pipes, have an inner wear-resistant coating composed of a ceramic material or of a wear-resistant casting/filling compound.

A wear-resistant casting or filling compound is applied, as a rule, via a complicated multi-part inner core made of wood or plastic or steel. When a filling compound is used, and if the pipe diameter is relatively large, this wear-resistant compound is normally applied by hand, with relatively high degrees of inaccuracy in the layer thickness.

SUMMARY OF THE INVENTION

The object on which the invention is based is to dispense with such special multi-part cores which are to be produced specially for each dimension or geometry and are highly complicated and costly in terms of manufacture and handling. As an addition to the object, pipes, pipe bends and the like are to be produced with an inner wear-resistant layer, as far as possible using a core which can be used as often as desired and allows executions having a defined geometry.

It would be particularly beneficial if the layer thickness of the wear-resistant lining could also be varied, so that the main wear zone at the outer region of the pipe bend could be reinforced and, by contrast, the zone not subject to wear could be made with reduced inner radius.

This is achieved, in a device of the type mentioned in the introduction, by means of an elongate, elastic, inflatable core, a so-called "variocore" (12).

The core expediently consists of an elastomer with a stiffer elastic fabric insert.

The abovementioned object is also achieved by means of a method for producing an inner coating on pipe bends or the like, which consist more generally of a body, in particular a tubular body, open at only at least one end, in that the variable core closed at one end is drawn through the pipe, pipe bend or the like via spreaders and has applied to it from the other side, by means of air or water, a pressure corresponding to a predetermined inside diameter. The variocore expediently consists of a dimensionally stable elastomer with a fabric insert having a specific elastic winding angle.

It is beneficial to have, at the filling end of the variocore, a cover, a shut-off member assigned to the latter and a pressure-measuring instrument and, outside the variocore and surrounding the latter, a charging funnel for the lining material.

In general, the variocore is designed for the filling of pipes and pipe bends and the like in a vertical position.

It is beneficial if, in the case of pipe bends, different radii can be set continuously between R=120 mm to RU=00 as a function of the inside diameter. After being introduced and predried, the variocore is relieved of pressure and the core pacing is drawn out. The spreaders are generally glued in.

The plugs to be applied, likewise composed of plastic, are approximately equal in outside diameter to the diameter of the structure to be lined and are held by means of a type of elastic clip, for example consisting of elastic steel.

One side of the variocore may be tapered during manufacture.

The variocore according to the invention can be used as often as desired. Executions having defined geometry are possible.

The variable core can be removed, after the filling of the pipe or of the pipe bend, without manual or mechanical modifications to the core itself.

A variable core is produced, by means of which, in the case of pipe bends, different radii can be set continuously from R=120 rum (as a function of the inside diameter) to R=00.

The core is expediently a variable core, by means of which different diameters can be set continuously within a range of 10% of the nominal diameter.

Where the variocore is concerned, an outer regulating 25 variable can be set so as to be capable of reproducing a defined and exact inside diameter.

The layer thickness of the wear-resistant lining may be varied in such a way that the main wear zones at the outer pipe bend are reinforced, whereas the zone not subject to wear is made with a reduced inner radius. The clear end-face pipe or lining diameters are exactly coaxial to the outer steel jacket or to the hole circle of the flange, specifically by means of special fixings which are distributed over the circumference and between which charging holes are obtained. In the procedure, the variocore is closed on the end face and has compressed air or water applied to it, depending on the pressure stage (water in the case of higher pressures), an exactly defined outside diameter being achieved at a specific internal pressure. The variocore can be used for different diameters, the outside diameter of the variocore being controlled via the internal pressure. Thus, it has been possible to use variocores within a diameter range of, for example, 110 to 125 mm, an advantage which is particularly evident compared to the multi-part, wooden cores which have to be manufactured additionally. Fields of use of the variocore when only one and the same core is used are the habitation of straight pipes, the habitation up to a radius/diameter ratio of 6:1, pipe bends with a continuous change of the radius from R=500 to a straight pipe, internal diameter equal to basic diameter +0±10%.

The device and the method can be applied to a multiplicity of pipes/pipe bends, those having either two flanges or one flange or those which are smooth-ended.

The centering of the inner core is carried out by means of special assembly flanges which allow charging of the wear-resistant casting compound and, on the other hand, ensure the coaxial position on the end faces. Such a core can theoretically be used as often as desired. Each core is based on a diameter variance of +10%. The variable core may be used in the case of pipe bends, the radius/diameter ratio of which is between 6:1. Clear diameters of wear-resistant pipes/pipe bends of 20 mm to 500 mm can be produced.

The casting compound can be selected such that the protection against wear meets the requirements. Using the one-part variocore, the introduction of an inner coating on pipe bends with a leg extension, specifically on one side or on both sides, has become possible in an elegant way.

BRIEF DESCRIPTION OF THE DRAWINGS

The invention will be explained in more detail by way of example by means of the embodiment of the invention according to the accompanying drawing in which.

DESCRIPTION OF THE PREFERRED EMBODIMENTS

Figures 1, 2:
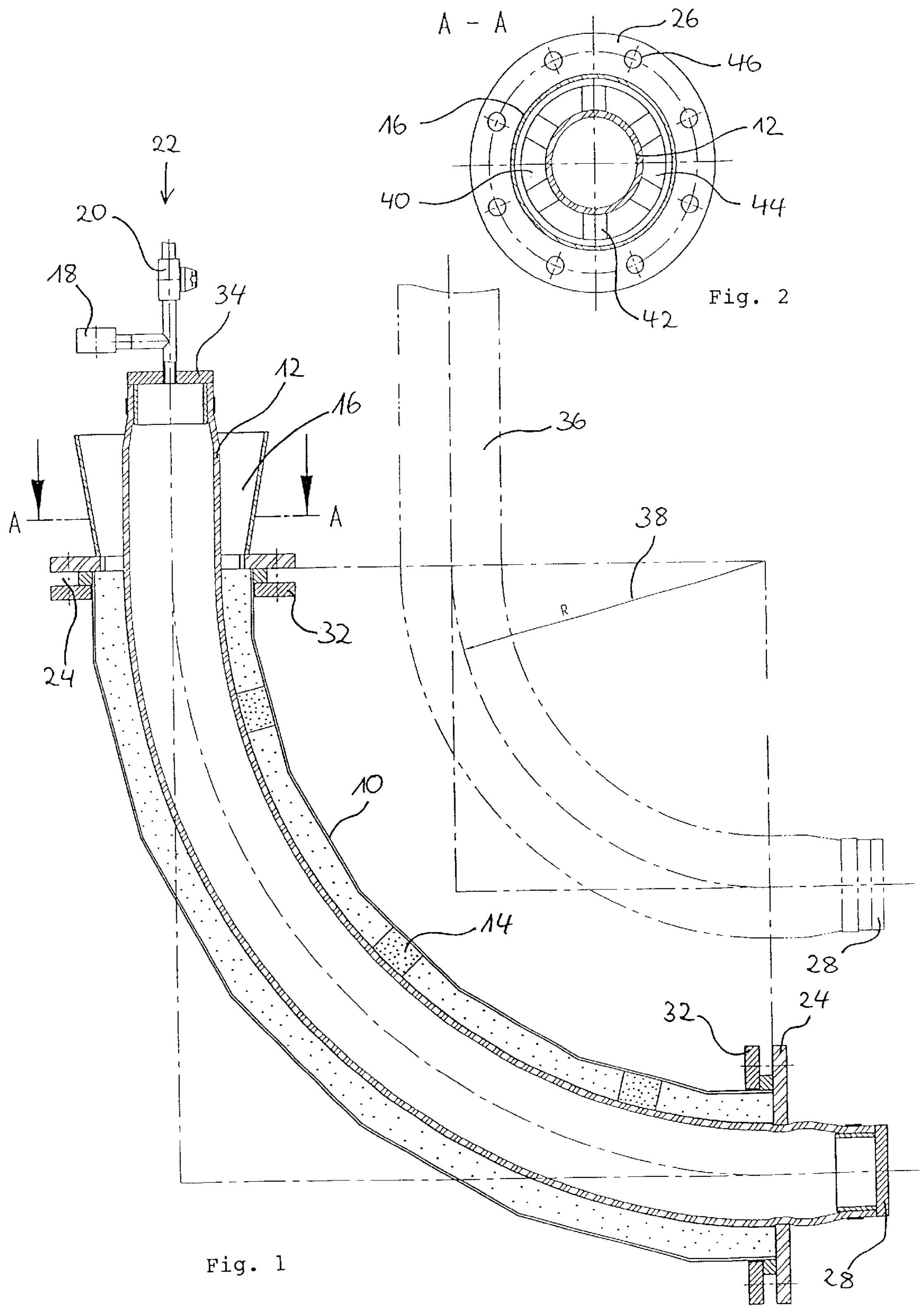
FIG. 1 shows a section through a pipe bend with an exemplary measure according to the invention, in the filling position.
FIG. 2 is a section along the line A—A FIG. 1.

A pipe bend 10 is equipped with glued-in spreaders 14. Collars 32 with a spacer piece are fastened, in particular welded on. An inner core, designated hereafter as a variocore 12, is drawn into the pipe bend and is centrically held coaxially via fixings 42 (see FIG. 2) distributed over the circumference. The variocore is tapered at the lower end and is closed by means of a cover 28 which consists, for example, of plastic and is held, for example, by means of a hose clip. Spreaders are attached over the pipe bend on the side on which the varicore would otherwise come to bear when tautened. Holding and centring flanges 24 and 26 are screwed against the collars 32. The flange 24 may, after filling, be drawn off and used again. The same applies to the arrangement of the filling flange 26 in relation to the collars 32. The flange 26 is connected to a charging funnel 16 which acts upon the charging orifice 40 (FIG. 2). At the filling end, too, a cover 34 is provided, which is fastened in a similar way to the cover 28. The cover carries a shut-off member 20, through which the fluid is introduced, and a pressure-measuring instrument 18 for measuring the applied fluid. The pipe bend with a leg extension 36 and the suggestion that the variocore can be used with different radii and diameters 38 is illustrated by broken lines. FIG. 2 shows in section, as seen from above, the charging orifices 40, the centrings or fixings 42, the variocore 12 and the screw holes 46 mentioned with regard to the collars. The variocore 38 can be used for different radii and diameters, even for straight pipes. The extension 36 may also be provided at the other end of the variocore.

According to a preferred embodiment, the variocore is a hollow cylinder with a selected elastomer having a Shore (A) hardness of approximately 45°. A special fabric winding may be introduced in a plurality of places as reinforcement. The wall thickness of the variocore may be dependent on diameter and amounts, for example, to between 6 and 15 mm.

A rigid core consisting, for example, of a drawn pipe bend which is wound around elastically could also be produced, if required, but would be not so economic in handling terms.

A rigid core wound around with a layer to be melted on could also be produced, and, after casting and hardening of the cast-in compound, melting-out of, for example, a wax winding by the inductive heating of the steel core would be conceivable.

The cores could also be produced as a solid core from a hard foam; this core would have to be removed merely by being dissolved or destroyed after the setting of the casting compound.

In a development of this area of the invention, cores could also be produced from a thin-walled plastic pipe. This would have to be slit open axially over a width of about 10 mm and a strip would be inserted into the slit width and retained; the strip is drawn after the hardening of the casting compound, so that the slit pipe core could be removed.

What is claimed is:

1. Device for introducing a coating into pipes and pipe bends being open at only at least one end, said coating device characterized by an elastic, elongate, inflatable core, the expansion of which is limited by spreaders to be fastened on the inside of the pipe or pipe bend.

2. Device according to claim 1, characterized in that the core (12) consists of an elastomer with a stiffer elastic fabric insert.

3. Device according to claim 1, characterized in that the core (12) consists of a dimentionally stable elastomer with a fabric insert having a specific elastic winding angle.

4. Device according to claim 1, characterized in that only one end has spreaders (14).

5. Device according to claim 1, characterized in that one end is closed by means of a plug (28) and a type of hose clip and is of a size smaller than the inside diameter to be produced for the inner lining.

6. Device according to claim 1, characterized in that the core (12) is designed for filling with a fluid, specifically, at lower pressures, with air, and, at higher pressures, with water.

7. Device according to claim 5, characterized in that in the region of the other end of the core (12) are provided a cover (34), a shut-off member (20) assigned to the latter and a pressure-measuring instrument (18) and, outside the core (12) and surrounding the latter, a charging funnel (16) for the lining material.

8. Device according to claim 1, characterized in that the core (12) is designed for the filling of pipe bends and rotationally symmetrical bodies in a vertical position.

9. Device according to claim 8, characterized in that, in the case of pipe bends, different radii can be set continuously between R=120 mm to R=8 as a function of the inside diameter.

10. Device according to claim 1, characterized in that the core (12) is designed in such a way that different diameters can be set continuously within a range of 10% around the nominal diameter.

11. Device according to claim 6, characterized in that a fixed internal pressure is assigned a specific outside diameter of the core (12).

* * * * *